Jan. 13, 1953     J. A. ANDERSON     2,624,959
STONE DIGGER

Filed Sept. 11, 1950                          2 SHEETS—SHEET 1

John A. Anderson
INVENTOR.

Jan. 13, 1953   J. A. ANDERSON   2,624,959
STONE DIGGER

Filed Sept. 11, 1950   2 SHEETS—SHEET 2

John A. Anderson
INVENTOR.

BY *Clarence A. O'Brien*
*and Harvey B. Jacobson*
Attorneys

Patented Jan. 13, 1953

2,624,959

UNITED STATES PATENT OFFICE 2,624,959

STONE DIGGER

John A. Anderson, Ortonville, Minn.

Application September 11, 1950, Serial No. 184,315

4 Claims. (Cl. 37—2)

This invention relates generally to agricultural implements, and more particularly to a stone digger, the subject matter representing an improvement over the subject matter of applicant's U. S. Patent No. 2,523,263 dated September 26, 1950. The primary object of this invention is to provide stone-engaging arms capable of being moved under power for effectively digging underneath stones embedded in the soil and thereafter raising these stones out of the soil.

Another object of this invention, of a specific nature, is to provide special mounting and actuating means for one set of arms in a stone digger having two sets of cooperating arms, whereby said one set can be made to rock about a horizontal axis as well as to move in a direction longitudinal of the arms in this said one set, with the result that this new combination of arms and means for controlling the same permits the operator to dig down as deeply as necessary and simultaneously to rock said one set of arms about the horizontal axis, thus facilitating the dislodgment of stones from the soil.

Another object of this invention is to provide special means whereby a set of stone engaging arms can be accurately controlled and moved in two directions successively or simultaneously while maintaining extremely rugged and simple mounting means for these arms.

With the above objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 4 is a vertical sectional view taken substantially on the line 4—4 in Figure 2; and Figure 5 is a horizontal sectional view taken substantially on the line 5—5 in Figure 4 and looking in the direction of the arrows.

Similar characters of reference designate similar or identical elements and portions throughout the specification and throughout the different views of the drawings.

Figure 1:
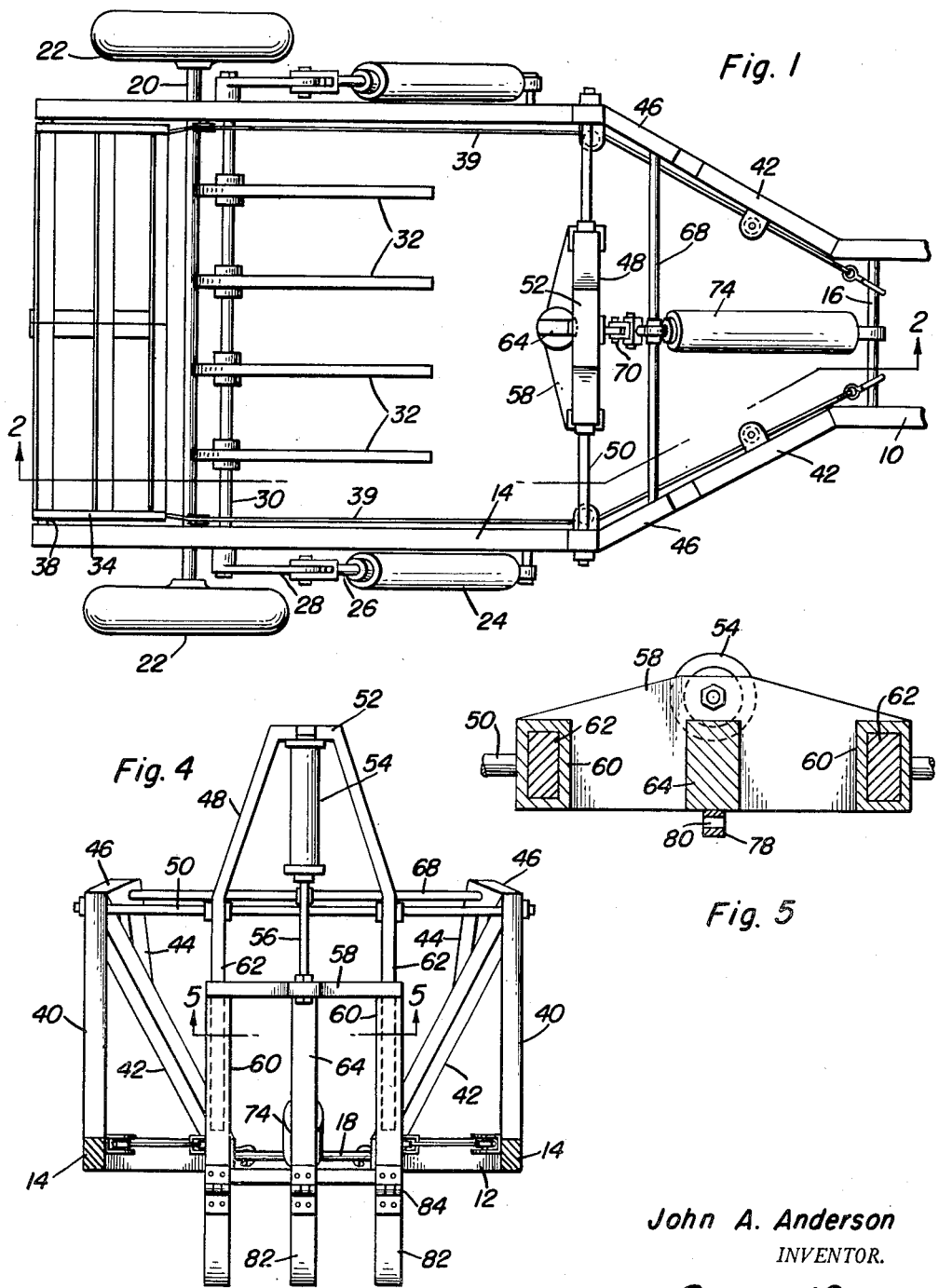
Figure 1 is a fragmentary top plan view of the assembled stone digger.

Referring now to the drawings in detail, this stone digger includes a frame having a reduced forward end comprised of a pair of parallel frame members 10 which will ordinarily be equipped for securement to a tractor and this tractor will be understood to be of the type having means to provide fluid under pressure for the cylinders hereinafter to be described in some detail. It is thought unnecessary in this application to represent the drawbar, or the tractor with its compressor means and connection with the cylinders, since this structure can be completely conventional and need involve no invention. The frame also includes horizontal, outwardly diverging frame members 12 and parallel main frame members 14 extending from the diverging members 12 to the rear of the machine. Cross-braced bars 16 and 18 are secured to and between opposing portions of the frame members 10 and 12, respectively.

Figure 2:
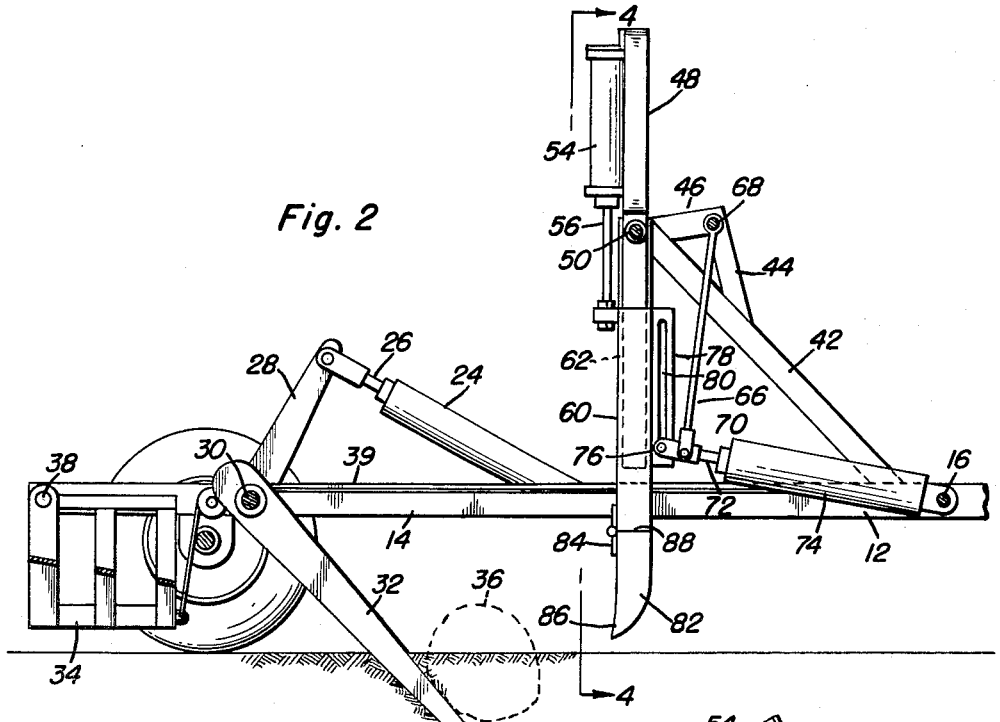
Figure 2 is a vertical sectional view of the structure shown in Figure 1, the view being taken substantially on the line 2—2 in Figure 1.

While the front end of the machine may be supported on the above-mentioned tractor, the rear end of the machine is supported by a dead axle 20 and a pair of ground-contacting wheels 22. A hydraulic cylinder 24 having a piston 26 is pivotally connected to the main frame members 14, and the piston 26 is pivoted at its outer end to a lever 28, whereby a cross shaft 30 rotatably mounted transversely of the main frame members 14 near the rear of the machine may be made to oscillate, and this shaft 30 carries a plurality of parallel horizontally spaced rear stone-engaging arms 32, and it may be here noted that the cylinders 24 and lever 28 may be provided in duplicate, one on each side of the machine as clearly indicated in Figure 1. The rear arms 32 may be rocked into downwardly and forwardly extending position, as indicated in Figure 2, or raised into the position indicated in Figure 3, by the action of the hydraulic cylinders 24. A stone receiving basket 34 is provided at the rear of the machine to receive the harvested stones, one of which is indicated at 36, this basket being pivoted about a horizontal axis at the extreme rear ends of the main frame members 14, as indicated at 38. Cables 39 are connected to these baskets and extended over pulleys so that one of the hydraulic cylinders on the machine may be used to unload the basket, all as fully described in the previously noted patent.

According to the instant improvement in stone digger construction, the said frame members support an upstanding frame portion comprised of opposed vertical frame members 40, fixed to the main frame members 14 at the junction thereof with the frame members 12, together with inclined brace members 42 and 44, the latter supporting forward end portions of horizontal frame members 46, the rear end portions of which are secured to the upper ends of the members 40. A U-shaped member 48 has its legs pivotally mounted on a cross shaft 50 mounted on and between upper end portions of the members 40. The bight portion 52 of the U-shaped member 48 has pivotally secured thereto a hydraulic cylinder 54 having a piston 56 connected to a cross-head 58. The cross-head 58 carries a pair of hollow arms 60 and the hollow portions or bore portions of the arms 60 are slidably received on portions 62 of the legs of the U-shaped member 48 extending from the side of the cross shaft 50 remote from the bight portions 52 of the U-shaped member. A third arm 64 will be rigidly secured to the cross-head 58, and this arm 64 need not be hollow.

An inflexible link 66 is pivoted at one end upon another cross shaft 68 which is secured to the forward ends of the frame members 46. The other end of the inflexible link 66 is pivoted to the piston rod terminal 70 on the piston rod 72 in the hydraulic cylinder 74. This hydraulic cylinder is pivotally mounted on the frame of the machine, preferably upon the cross bar 16.

The central arm 64 has rigidly secured on one side thereof an elongated member 78 having a slot 80 extending parallel to the arm 64 and receiving a pivot pin 76 carried by the piston rod terminal 70. Finally, it should be noted that the forward ends of the arms 60 and 64 have stone-engaging tips 82 hinged to the arms, as indicated at 84. These tips have slightly arcuate outer end portions terminating in points 86, while the inner end portions of the tips are flat to abut similarly shaped end portions of the arms 60 and 64, as indicated clearly at 88 in Figure 2.

Figure 3:
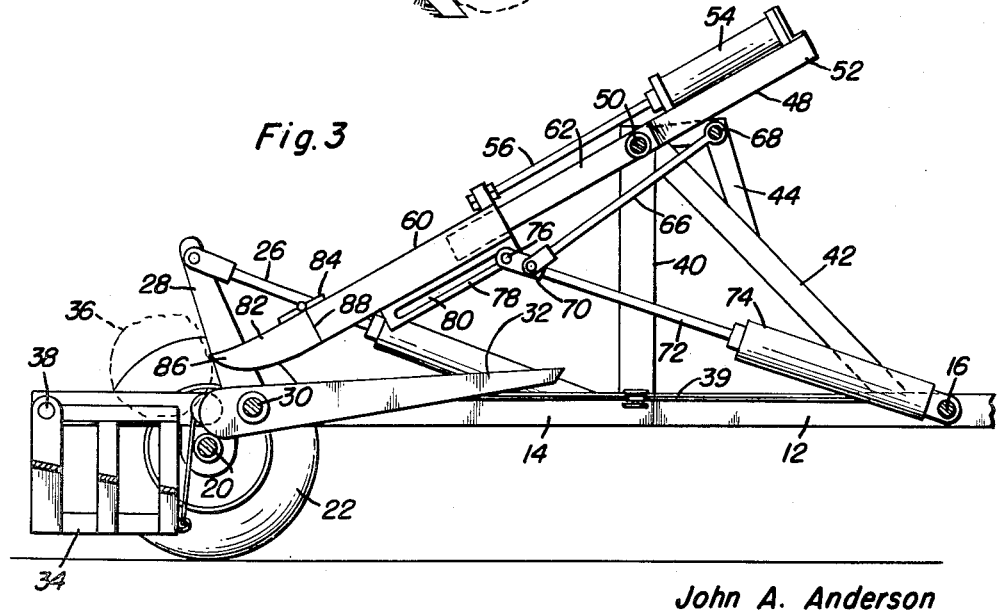
Figure 3 is a view similar to Figure 2, except that the arms and the parts connected therewith are shown in a second position, as when a stone has been raised out of the soil and is being rolled to the rear of the machine.

The operation of this invention will be clearly understood from a consideration of the foregoing description of the mechanical details thereof, taken in connection with the drawings and the above recited objects. In recapitulation, it may be added that the tips 82 may be forced into the ground beside a stone 36, the vertical movement of the arms 60 and 64 with their tips 82 being accomplished by actuation of the hydraulic cylinder 54. Thereafter, or simultaneously therewith, the cylinder 74 may be actuated to move the arms 60 and 64 to pivot about the cross shaft 50, thus bringing the tips 82, or at least the points 86 thereof, into contact with the stone 36. It will be understood that the arms 32 can be forced into the ground beside the stone 36 by prior movement of the implement as a whole, with the proper actuation of the cylinder 24. Obviously, the cylinder 24, or both cylinders 24, if there be two as illustrated, and the cylinder 74 may be used to raise the stone until the same rolls, as indicated in Figure 3, into the basket 34 at the rear of the machine. The advantage of the structure illustrated and described in detail in this specification, as compared with other stone diggers will now be obvious, since the adaptability and versatility of the machine is greatly enhanced by the fact that the arms 60 and 64 can be moved as described, thus facilitating the joggling and levering action necessary to dislodge relatively heavy stones when the same are embedded fairly deeply in the soil. It is clear that all the objects of the invention recited above are amply achieved by this invention and further description would appear to be unnecessary.

Having described the invention, what is claimed as new is:

1. A stone digger including a wheeled frame, forwardly extending stone-engaging arms pivoted on a rear portion of the frame to move about a horizontal axis, coacting stone-engaging arms mounted on said frame in front of the first-mentioned arms for movement downwardly and rearwardly selectively and concurrently, and means to move all said arms in the said directions, whereby a stone may be engaged by and between the first and second-mentioned arms and raised out of the ground, said frame having a horizontal cross shaft, a U-shaped member pivoted on said shaft and having a bight portion on one side of the shaft and parallel legs extending in the opposite direction, said second-mentioned arms being slidably mounted on said legs, said second-mentioned arms having a cross-head joining the same, and a hydraulic cylinder pivoted on said bight portion and having its piston rod connected to said cross-head.

2. A stone digger according to claim 1 and including means to pivot said U-shaped member about said shaft.

3. A stone digger according to claim 2 and wherein said means includes a second hydraulic cylinder pivoted on each frame and having a piston connected to said cross-head for sliding movement longitudinally of the second-mentioned arms, and an inflexible link pivoted to and between an outer end portion of the second-mentioned piston and said frame.

4. A stone digger including a wheeled frame, a cross shaft mounted on said frame above the same, a U-shaped member pivoted on said shaft for vertical swinging thereon, a cross head vertically slidable on said member and swingable therewith, stone engaging arms carried by said cross head for vertical sliding and swinging therewith to dig the stones, a hydraulic cylinder on said member having a piston operatively connected to said cross head to slide the same and thereby slide said arms, a second hydraulic cylinder pivoted on said frame and having a piston provided with a vertically slidable connection to one of the arms for swinging the same together with the other arms and the cross head and member, and a link having a pivotal mounting on said frame and pivoted to the second named piston to cause vertical swinging thereof and thereby cause vertical sliding of said slidable connection.

JOHN A. ANDERSON.

REFERENCES CITED

The following references are of record in the file of this patent:

UNITED STATES PATENTS

| Number | Name | Date |
|---|---|---|
| 817,662 | Pearson | Apr. 10, 1906 |
| 1,209,353 | Story | Dec. 19, 1916 |
| 1,478,142 | Ortmann | Dec. 18, 1923 |
| 2,523,263 | Anderson | Sept. 26, 1950 |